(12) United States Patent
Matsubara et al.

(10) Patent No.: US 7,235,905 B2
(45) Date of Patent: Jun. 26, 2007

(54) ELECTRIC POWER STEERING ASSEMBLY

(75) Inventors: Ken Matsubara, Matsubara (JP); Yoshikazu Kuroumaru, Kashiwara (JP); Katsutoshi Nishizaki, Nabari (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/998,052

(22) Filed: Nov. 29, 2004

(65) Prior Publication Data
US 2005/0116561 A1  Jun. 2, 2005

(30) Foreign Application Priority Data
Nov. 28, 2003  (JP) .............................. 2003-400139

(51) Int. Cl.
*H02K 5/15* (2006.01)
(52) U.S. Cl. ........................................ 310/89; 310/258
(58) Field of Classification Search ................ 310/258, 310/259, 254, 89, 68 R, 91; 74/388 PS, 74/421 A, 425
See application file for complete search history.

(56) References Cited

U.S. PATENT DOCUMENTS

| | | | | |
|---|---|---|---|---|
| 4,716,648 A | * | 1/1988 | Nel ............................. | 29/596 |
| 4,881,001 A | * | 11/1989 | Patel et al. ................. | 310/258 |
| 5,585,682 A | * | 12/1996 | Konicek et al. ............... | 310/89 |
| 6,822,364 B2 | * | 11/2004 | Suzuki et al. ................ | 310/218 |
| 2004/0065163 A1 | | 4/2004 | Takahashi et al. | |

FOREIGN PATENT DOCUMENTS

| | | | |
|---|---|---|---|
| FR | 2723491 | 8/1994 | |
| GB | 575491 | 2/1946 | |
| JP | 63-31458 | * 2/1988 | ............... 310/68 R |
| JP | 2003-113909 | 4/2003 | |

OTHER PUBLICATIONS

An English-language Abstract of the Japanese patent publication No. 2003113909 (Apr. 18, 2003).

* cited by examiner

*Primary Examiner*—Nguyen Tran
(74) *Attorney, Agent, or Firm*—Rabin & Berdo PC

(57) ABSTRACT

An electric power steering assembly includes an electric motor, a reduction mechanism for reducing the speed of an output rotation of the electric motor, and a reduction-mechanism housing accommodating therein the reduction mechanism. The electric motor includes: an output shaft rotatably supported by the reduction-mechanism housing, a motor housing formed integrally with the reduction-mechanism housing, a rotor, and a stator assembly accommodated in an annular space defined between the rotor and the motor housing. When the stator assembly is assembled in the annular space via an opening at an end portion of the motor housing, a guided portion on an outside circumference of a stator yoke is guided by a guide portion on an inside circumference of the motor housing.

18 Claims, 4 Drawing Sheets

ELECTRIC POWER STEERING ASSEMBLY

BACKGROUND OF THE INVENTION

1. Field of the Invention

The present invention relates to an electric power steering assembly and a fabrication method thereof.

2. Description of Related Art

An electric power steering assembly is generally designed to transmit an output rotation of an electric motor to a steering mechanism via a reduction mechanism including a driving gear and a driven gear accommodated in a gear housing. The electric motor is normally constructed independently from the reduction mechanism. Hence, an output shaft is previously assembled to the electric motor (motor assembly) and then, the output shaft thus assembled is coupled with the driving gear of the reduction mechanism via a joint. More recently, however, a new design directed to the size reduction of the assembly has been proposed, wherein the joint is eliminated while the output shaft of the electric motor is integrally formed with the above driving gear (see, for example, Japanese Unexamined Patent Publication No. 2003-113909 laid open on Apr. 18, 2003 by Japan Patent Office).

In this case, the assembly is assembled as follows. The output shaft is first supported by the gear housing via a bearing and then, is assembled with a rotor. The rotor is inserted in an inside circumference of a stator previously fixed on a motor housing. In this state, the motor housing is fixed to the gear housing.

According to the above publication, however, the following problems are encountered when the rotor is assembled in the stator. Due to the magnetic force of magnets of the rotor, the rotor is attracted toward the stator so that the rotor is not smoothly inserted in the inside circumference of the stator. This makes the assembly work cumbersome. Furthermore, there is a potential fear of the rotor brought into violent contact with the magnets as attracted by the stator. As a result, the rotor may be damaged.

It may be contemplated to employ jigs to retain the rotor and the stator thereby preventing the rotor from being attracted toward the stator. However, this approach requires additional labor for removing the mounted jigs.

In view of the foregoing, it is an object of the invention to provide an electric power steering assembly designed to reduce the labor involved in the assembly work and to prevent the damage on the electric motor, as well as to provide a fabrication method thereof.

SUMMARY OF THE INVENTION

According to an embodiment of the invention for achieving the above object, an electric power steering assembly comprises an electric motor providing steering assist, a reduction mechanism for speed reduction of an output rotation of the electric motor, and a reduction-mechanism housing accommodating therein the reduction mechanism. The electric motor includes an output shaft rotatably supported by the reduction-mechanism housing, a rotor having an outer periphery and rotatable integrally with the output shaft, a cylindrical motor housing having an inside circumference surrounding the outer periphery of the rotor, an annular space defined between the outer periphery of the rotor and the inside circumference of the motor housing, and an annular stator assembly accommodated in the annular space. The motor housing is integrally formed with the reduction-mechanism housing. The motor housing includes an end portion arranged on an opposite side from the reduction-mechanism housing, whereas the end portion of the motor housing defines an opening having a size to allow the stator assembly to be assembled in the motor housing. The electric motor includes a cover for closing the opening at the end portion of the motor housing. The stator assembly includes a cylindrical stator yoke having an inside circumference and an outside circumference, and fixed in the motor housing. The inside circumference of the motor housing includes a guide portion, whereas the outside circumference of the stator yoke includes a guided portion. When the stator assembly is assembled in the annular space via the opening at the end portion of the motor housing, the guided portion of the stator yoke is guided by the guide portion of the motor housing, so as to prevent the stator assembly from contacting the rotor.

According to the embodiment, the motor housing may be used as a guide jig during the assembly of the stator assembly. Specifically, when the stator assembly is inserted in the annular space between the motor housing and the rotor, the inside circumference of the motor housing can retain the stator assembly so as to restrict the stator assembly from radial movement despite magnetic attraction by magnets of the rotor.

Accordingly, the stator assembly may be mounted in the annular space quite easily. In addition, it is ensured that both the stator assembly and the rotor are positively prevented from contacting each other and causing damage on each other. Since the motor housing per se is used as the guide jig for the stator assembly, the removal of the jig following the assembly of the stator assembly is omitted, although the conventional art requires the removal of the jig. Thus, the labor involved in the assembly work may be reduced even further.

DETAILED DESCRIPTION OF THE PREFERRED EMBODIMENT

A preferred embodiment of the invention is described with reference to the accompanying drawings.

Figure 1:
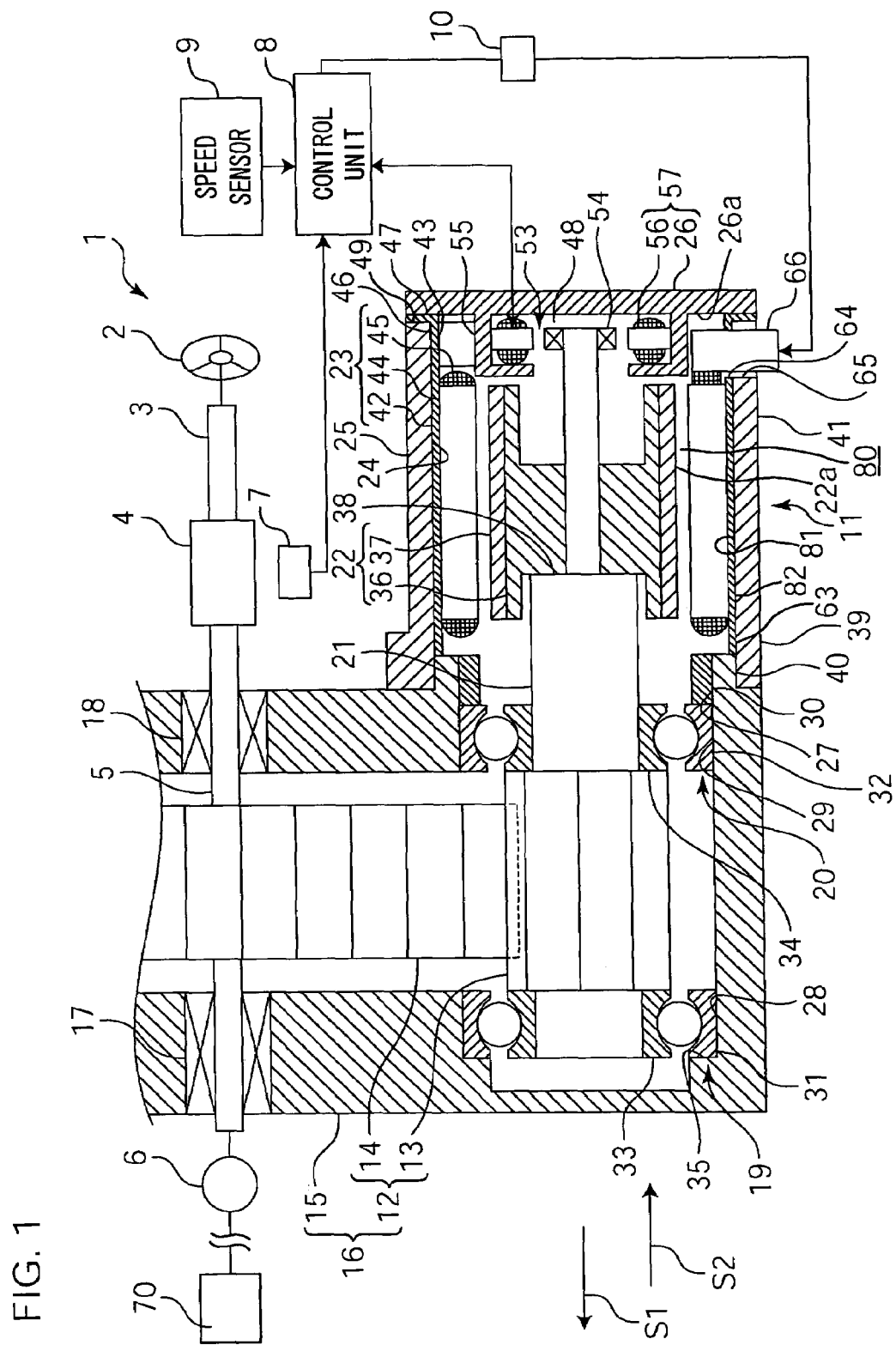
FIG. 1 is a schematic sectional view showing a general construction of an electric power steering assembly according to one embodiment of the invention.

FIG. 1 is a schematic sectional view showing a general construction of an electric power steering assembly according to one embodiment of the invention. Referring to FIG. 1, an electric power steering assembly 1 includes a first steering shaft 3 integrally rotatably coupled to a steering member 2 such as a steering wheel, and a second steering shaft 5 coaxially coupled to the first steering shaft 3 via a torsion bar 4 as allowed to rotate relative to the first steering shaft.

The second steering shaft 5 is coupled with a steering mechanism (not shown) including a pinion, a rack shaft and the like via a universal joint 6, an intermediate shaft (not shown) and the like.

Thus, a torque produced by manipulating the steering member 2 is transmitted to a steering mechanism 70 such as a rack and pinion type steering mechanism via the first steering shaft 3, the torsion bar 4, the second steering shaft 5, the universal joint 6 and the like, whereby road wheels (not shown) can be steered.

A torque sensor 7 is provided for sensing a quantity of relative rotational displacement between the first steering shaft 3 and the second steering shaft 5 which are interconnected via the torsion bar 4. The torque sensor 7 supplies a detection signal to a control unit 8 including a microprocessor and the like. Based on the detection signal from the torque sensor 7, the control unit 8 calculates a steering torque applied to the steering member 2. Based on the steering torque so calculated and a vehicle-speed detection signal from a speed sensor 9, the control unit 8 controls voltage applied, via a driver 10, to an electric motor 11 providing steering assist. This activates the electric motor 11, an output rotation of which is transmitted to the second steering shaft 5 via a reduction mechanism 12, and then to the aforesaid steering mechanism 70 via the universal joint 6 and the like. Thus is provided the assist for the driver steering a vehicle.

The reduction mechanism 12 includes, for example, a spur gear mechanism as a mechanism of gear pair with parallel axes. Specifically, the reduction mechanism 12 includes a driving gear 13, and a driven gear 14 meshed with the driving gear 13 so as to transmit the driving force to the aforesaid steering mechanism. The driven gear 14 is coupled with the second steering shaft 5 in a manner to be allowed to rotate integrally therewith but inhibited from moving axially. The driving gear 13 and the driven gear 14 are accommodated in a reduction-mechanism housing 15. Thus is formed a speed reducer 16 including the driving gear 13, the driven gear 14 and the reduction-mechanism housing 15. The reduction-mechanism housing 15 is formed from, for example, an aluminum alloy and rotatably supports the second steering shaft 5 via bearings 17, 18.

The electric motor 11 comprises a brushless motor, for example. The electric motor 11 includes an output shaft 21 rotatably supported by the reduction-mechanism housing 15 via bearings 19, 20 such as ball bearings, a rotor 22 having an outer periphery 22a and integrally rotatably retained by the output shaft 21, an annular stator assembly 23 surrounding the rotor 22, a cylindrical motor housing 25 connectable with the reduction-mechanism housing 15 to form an integral unit, and a cover 26.

The motor housing 25 includes an inside circumference 24 defined by a cylindrical surface retaining the stator assembly 23. An annular space 80 is defined between the outer periphery 22a of the rotor 22 and the inside circumference 24 of the motor housing 25. The annular space 80 accommodates the stator assembly 23 therein.

The output shaft 21 is integrally formed with the driving gear 13 by using a single member. The output shaft 21 also serves as a support shaft of the driving gear 13, thereby realizing a structure excluding a joint between the output shaft 21 and the driving gear 13. Alternatively, the output shaft 21 and the driving gear 13 may be formed separately and the driving gear 13 may be fixed to one end of the output shaft 21.

A part of the output shaft 21, which is formed with the driving gear 13, is accommodated in the reduction-mechanism housing 15. The other part of the output shaft 21 extends outward of the reduction-mechanism housing 15 through an insertion hole 27. The output shaft 21 is assembled with the aforesaid bearings 19, 20 which sandwich the driving gear 13 therebetween. The output shaft 21 is rotatably supported by support holes 28, 29 of the reduction-mechanism housing 15 via the respectively corresponding bearings 19, 20.

The output shaft 21 is restricted from an axial movement relative to the reduction-mechanism housing 15 by the bearings 19, 20 and a thread member 30 threaded into the insertion hole 27 of the reduction-mechanism housing 15. Specifically, outer rings 31, 32 of the bearings 19, 20 are fitted in individually corresponding support holes 28, 29 of the reduction-mechanism housing 15. On the other hand, respective inner rings 33, 34 of the bearings 19, 20 are fitted on the output shaft 21.

The outer ring 31 of the bearing 19 abuts against a step 35 of the reduction-mechanism housing 15 so as to be restricted from a movement in a first axial direction S1 of the output shaft 21. The inner ring 33 of the bearing 19 abuts against the driving gear 13 so as to be restricted from a movement in a second axial direction S2 of the output shaft 21.

The inner ring 34 of the bearing 20 abuts against the driving gear 13 so as to be restricted from a movement in the first axial direction S1. The outer ring 32 of the bearing 20 is urged in the first axial direction S1 of the output shaft 21 by the thread member 30. The thread member 30 applies a pre-load to the bearings 19, 20 and also axially positions the output shaft 21.

The rotor 22 includes a spacer 36 securely fitted on an outside circumference of the portion of the output shaft 21 that projects from the reduction-mechanism housing 15, and a plurality of rotor magnets 37 fixed on an outer periphery of the spacer 36 at equal circumferential space intervals. The spacer 36 abuts against a positioning step 38 of the output shaft 21 so as to be axially positioned.

The motor housing 25 is formed from, for example, an aluminum alloy. The motor hosing has openings at the both ends thereof and surrounds the outer periphery of the rotor 22. The motor housing 25 has a first end portion 39 and another end portion 41. The first end portion 39 is relatively farther away from the cover 26, whereas the second end portion 40 is relatively closer to the cover 26.

The first end portion 39 of the motor housing 25 is securely fitted on an outside circumference of a cylindrical projection 40 of the reduction-mechanism housing 15. The cover 26 is designed to be connected to the other end portion 41 of the motor housing 25.

The stator assembly 23 includes a cylindrical stator yoke 42 having an inside circumference 42a and an outside circumference 42b and adapted to be fitted in the inside circumference 24 of the motor housing 25, a plurality of stator cores 44 retained on an inside circumference 42a of the stator yoke 42 as forming an annular configuration, and a coil 45 wound about each of the stator cores 44.

The stator yoke 42 is formed from a magnetic material in a smaller thickness than that of the motor housing 25. The stator yoke 42 is formed from the magnetic material, thereby preventing a magnetic field within the motor housing 25 from leaking outside. The stator yoke 42 is designed to have an outside diameter substantially equal to an inside diameter of the motor housing 25, so as to be clearance-fitted in the cylindrical surface defined by the inside circumference 24 of the motor housing 25. Thus, the stator yoke 42 is restricted from a radial movement relative to the motor housing 25 and the rotor 22.

The inside circumference 24 of the motor housing 25 is formed with a guide portion 81 defined by a cylindrical surface, whereas the outside circumference 42b of the stator yoke 42 is formed with a guided portion 82 defined by a cylindrical surface guided by the guide portion 81.

When the stator assembly 23 is assembled in the annular space 80 through an opening 48 at the end portion 41 of the motor housing 25, the guided portion 82 of the stator yoke 42 is guided by the guide portion 81 of the motor housing 25, so that the stator assembly 23 is prevented from contacting the rotor 22.

The stator yoke 42 is formed with an annular flange 47 projected from an outside circumference of one end 46 thereof. The stator yoke has its flange 47 received by a circumferential edge 49 of the opening 48 at the other end portion 41 of the motor housing 25, so as to be axially positioned. The flange 47 functions as an axial positioning element for positioning the stator yoke 42 with respect to an axial direction of the motor housing 25.

Figure 2:
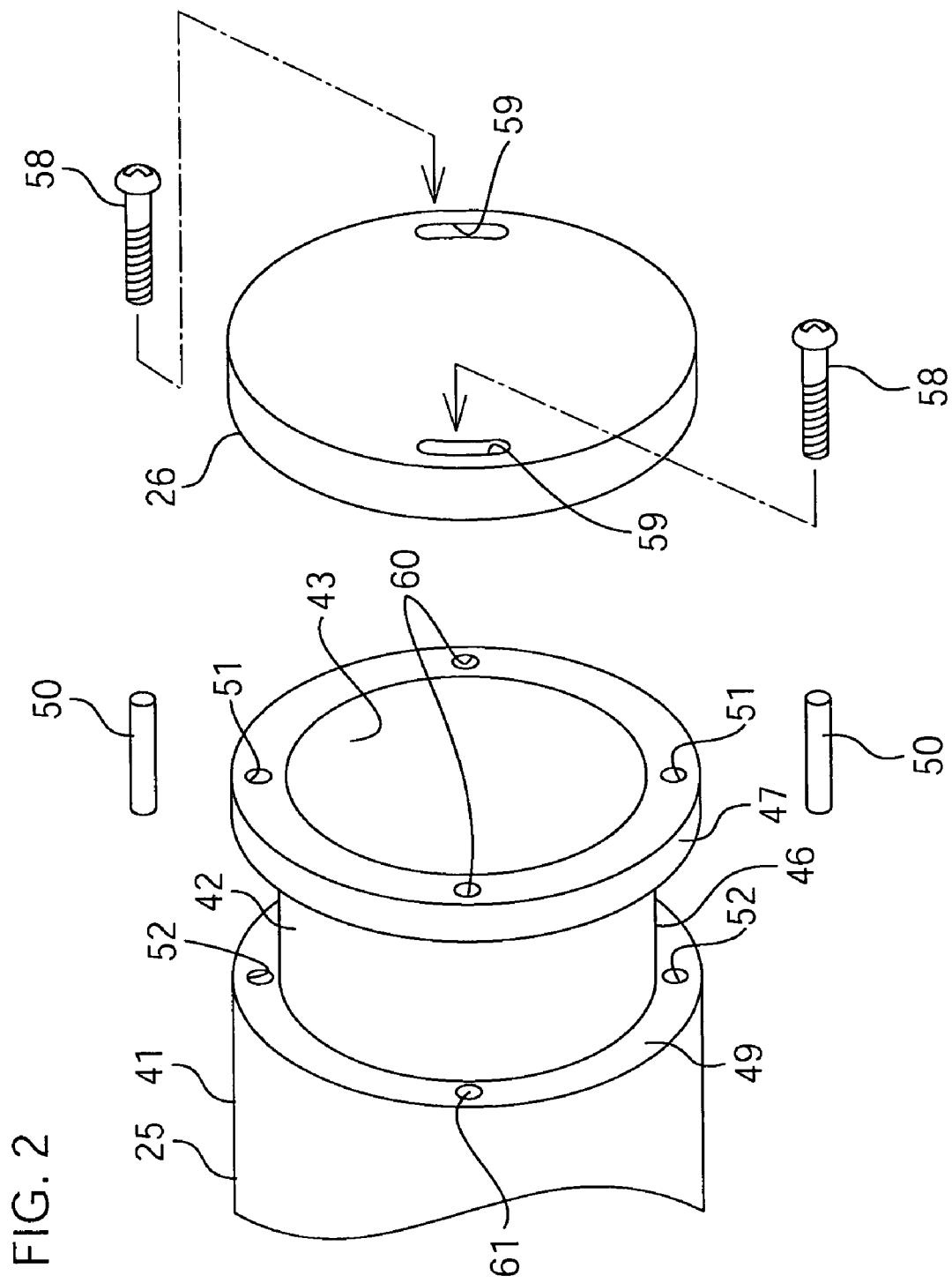
FIG. 2 is a disassembled perspective view showing a motor housing, a stator yoke and a cover.

FIG. 2 is a fragmentary disassembled perspective view schematically showing the motor housing 25, the stator yoke 42 and the cover 26. Referring to FIG. 2, the flange 47 of the stator yoke 42 is restricted from a rotation relative to the circumferential edge 49 of the opening 48 of the motor housing 25 by a pin 50. The pin 50 functions as a circumferential positioning element for positioning the stator yoke 42 with respect to a circumferential direction of the motor housing 25.

Specifically, the flange 47 of the stator yoke 42 is formed with a pin insertion hole 51. A plural number of pin insertion holes 51 (two pin insertion holes formed according to the embodiment) are formed through the flange 47 at equal circumferential space intervals. Furthermore, pin insertion holes 52 are formed in the circumferential edge 49 of the opening 48 of the motor housing 25. The pin insertion holes 52 are formed at places individually corresponding to the pin insertion holes 51. The pins 50 are inserted through the corresponding pin insertion holes 51 and are further press-fitted in the corresponding pin insertion holes 52 to be fixed therein.

Returning to FIG. 1, the stator cores 44 are arranged on the cylindrical surface of the inside circumference 43 of the stator yoke 42 at equal circumferential space intervals. The stator cores 44 are connected with one another to form an annular configuration as a whole. The stator cores 44 are fixed to the cylindrical surface of the inside circumference 43 of the stator yoke 42 by press-fit for example. The stator yoke 42 surrounds the rotor 22 in coaxial relation therewith. The coil 45 of the stator assembly 23 is connected with a connector 66, which is led out through connector insertion holes 64, 65 of the stator yoke 42 and the motor housing 25 so as to be exposed outside. The cover 26 is formed from, for example, an aluminum alloy. One side face 26a of the cover 26 is pressed against the flange 47 of the stator yoke 42 so as to close the opening 48 at the other end portion 41 of the motor housing 25.

The electric motor 11 further includes a resolver 53 as rotation angle detecting members for sensing a rotation angle of the output shaft 21. The resolver 53 supplies a detection signal to the control unit 8.

The resolver 53 includes a resolver rotor 54 as a movable member integrally rotatably retained on an outside circumference of the other end of the output shaft 21, and a resolver stator 56 as a stationary member surrounding the resolver rotor 54 as retained on an inside circumference of a retaining portion 55 defined by a cylindrical projection projected from the one side face 26a of the cover 26. Thus is formed a cover assembly 57 including the cover 26 and the resolver stator 56.

Referring to FIG. 1 and FIG. 2, the cover 26 is fixed to the circumferential edge 49 of the opening 48 at the other end portion 41 of the motor housing 25 by a screw 58 as a fixing member for fixing the cover 26. As retained by the motor housing 25, the cover 26 may be turned for adjustment of the position of the resolver stator 56.

Specifically, the cover 26 comprises a disk having a central axis 90 disposed coaxially with the cylindrical motor housing 25. The cover 26 includes a plurality (say two) of screw insertion holes 59 of an arcuate form about the aforesaid central axis 90.

The screw insertion holes 59 are arranged on a circle about the central axis 90 of the cover 26 with equal spacing and extended along a circumferential direction of the cover 26. The flange 47 of the stator yoke 42 is formed with screw insertion holes 60 at places individually corresponding to the screw insertion holes 59. Furthermore, the circumferential edge 49 of the opening 48 of the motor housing 25 is formed with screw holes 61 (only one of which is shown in FIG. 2) at places individually corresponding to the screw insertion holes 59.

The cylindrical projection defining the aforesaid retaining portion 55 of the cover 26 is formed coaxially with the central axis 90. That is, the resolver stator 56 is disposed coaxially with the central axis 90.

The screws 58 (as fixing members) are inserted through the individually corresponding screw insertion holes 59 and screw insertion holes 60 and threaded into the individually corresponding screw holes 61. As a result, the cover 26 together with the flange 47 of the stator yoke 42 are fixed to the circumferential edge 49 of the opening 48 at the end portion 41 of the motor housing 25 by these screws 58.

With the screws 58 loosely threaded in the screw holes 61, the cover 26 may be turned about the central axis 90 thereof, thereby adjusting the position (phase) of the resolver stator 56 relative to the resolver rotor 54. The adjustable range corresponds to a range in which the screws 58 are relatively movable in the screw insertion holes 59.

Figure 3:
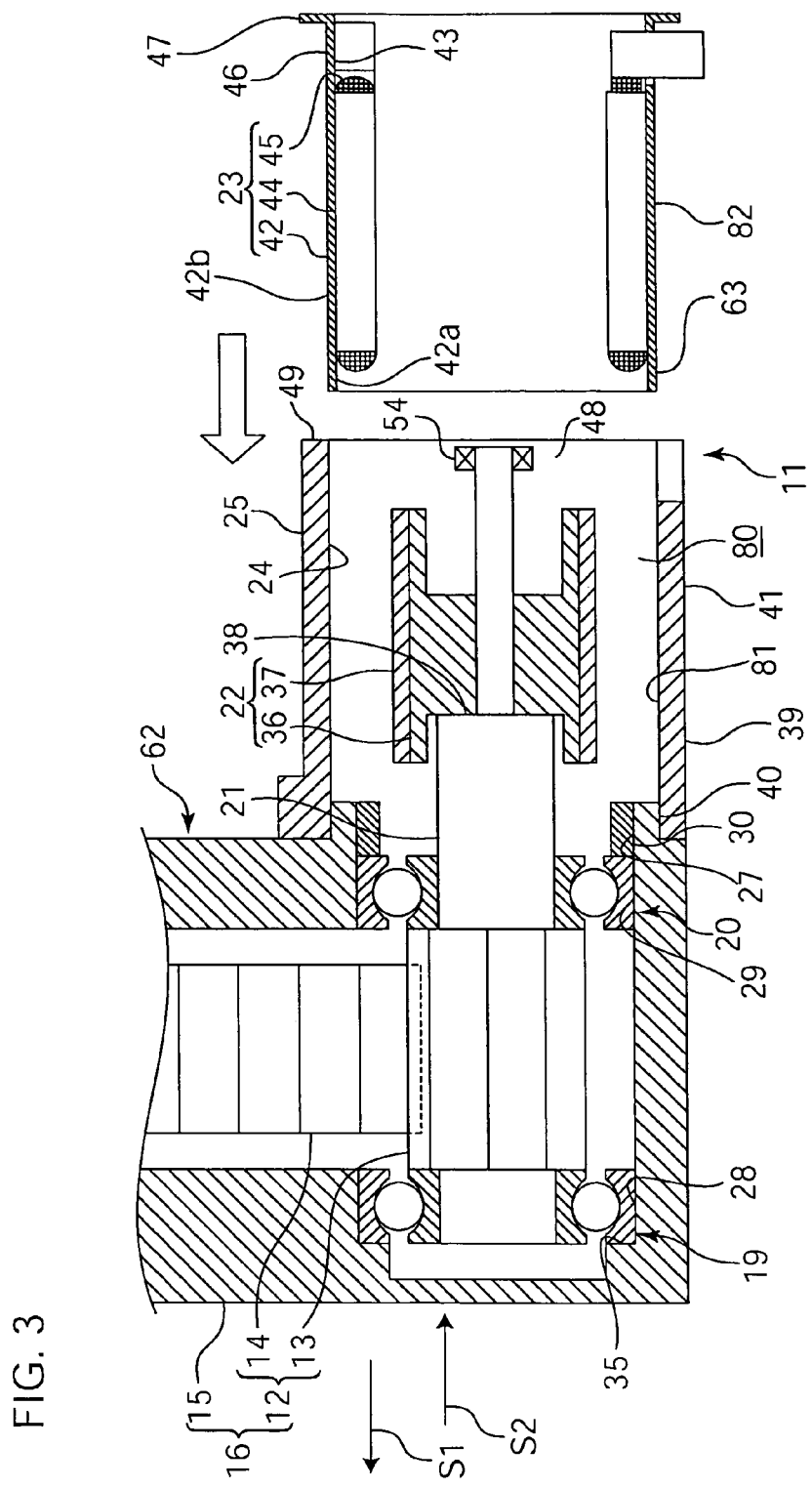
FIG. 3 is a diagram for explaining a method of fabricating the electric power steering assembly.
Figure 4:
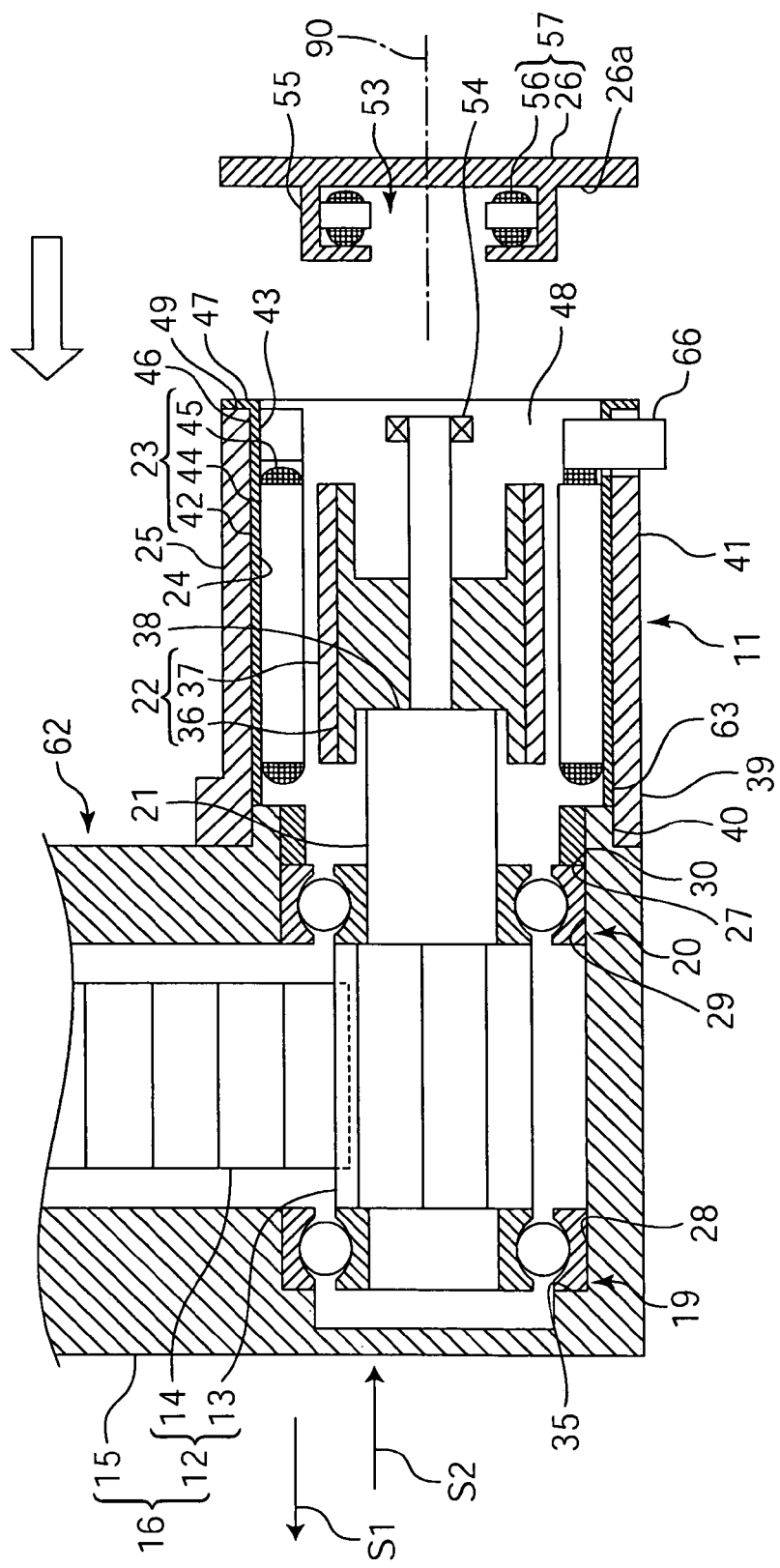
FIG. 4 is a diagram for explaining the method of fabricating the electric power steering assembly.

The foregoing description is about the general construction of the electric power steering assembly 1. Next, description is made on a method of fabricating the electric power steering assembly 1. FIG. 3 and FIG. 4 are diagrams for explaining the method of fabricating the electric power steering assembly 1.

Referring to FIG. 3 and FIG. 4, the method of fabricating the electric power steering assembly 1 comprises: a first step of assembling a sub-assembly 62 and the stator assembly 23, respectively; a second step of assembling the sub-assembly 62 and the stator assembly 23 to each other; a third step of fixing the stator assembly 23 to the sub-assembly 62 in a manner to inhibit the relative rotation thereof; and a fourth step of assembling the cover assembly 57 to the motor housing 25 and adjusting the position of the resolver stator 56.

The sub-assembly 62 includes the reduction-mechanism housing 15, the output shaft 21, the rotor 22, the motor housing 25 and the resolver rotor 54. That is, the reduction-mechanism housing 15 in the state of the sub-assembly 62 is unitized with the motor housing 25 while retaining the output shaft 21 via the bearings 19, 20. Furthermore, the outer peripheries of the rotor 22 and the resolver rotor 54, which are retained by the output shaft 21, are protected as surrounded by the motor housing 25.

The second step is carried out as follows. Firstly, through the opening 48 at the other end portion 41 of the motor housing 25, an end 63 of the stator yoke 42 of the stator assembly 23 is fitted into the cylindrical surface of the inside circumference 24 of the motor housing 25 (along the second axial direction S2).

Next, the stator yoke 42 of the stator assembly 23 is pushed into the motor housing toward the reduction-mechanism housing 15 (along the first axial direction S1 indicated by a hollow arrow). In this process, the guided portion 82 of the stator yoke 42 of the stator assembly 23 is guided by the guide portion 81 on the inside circumference 24 of the motor housing 25, as allowed to move axially but restricted from radial movement. Thus, the stator assembly 23 is fitted in the annular space 80 between the motor housing 25 and the rotor 22. The stator assembly 23 so fitted is axially positioned by way of the flange 47 of the stator yoke 42 received by the circumferential edge 49 of the opening 48 of the motor housing 25.

Referring to FIG. 2 and FIG. 4, the third step is carried out as follows. The pins 50 are inserted through the individually corresponding pin insertion holes 51 in the stator yoke 42 of the stator assembly 23 and then, are pressed into the individually corresponding pin insertion holes 52 of the motor housing 25.

After the stator assembly 23 is fixed in the sub-assembly 62, the fourth step is carried out as follows. The cover 26 is abutted against the flange 47 of the stator yoke 42 of the stator assembly 23 in a manner to allow the resolver stator 56 to surround the resolver rotor 54. Then, the screws 58 are inserted through the individually corresponding screw insertion holes 59 of the cover 26 and the individually corresponding screw insertion holes 60 of the stator yoke 42 and then, are threaded into the individually corresponding screw holes 61 of the motor housing 25. In this process, the cover assembly 57 is turned for adjusting the circumferential position (phase) of the resolver stator 56 before the screws 58 are fully threaded in or in a state where the screw insertion holes 59 are free to move relative to the screws 58.

According to the embodiment as described above, the motor housing 25 as assembled into the state of the sub-assembly 62 is adapted to cover the outer peripheries of the rotor 22 and the resolver rotor 54, thereby protecting the rotor 22 and the resolver rotor 54. This prevents the rotor 22 and the resolver rotor 54 from being damaged by a foreign article which may inadvertently contact the rotor or the resolver rotor when another component is assembled to the sub-assembly 62 or the sub-assembly 62 is transported.

The stator assembly 23 is previously assembled independently from the sub-assembly 62, thereby allowing the individual components 42, 44, 45 of the stator assembly 23 to be fitted in the cylindrical surface of the inside circumference 24 of the motor housing 25 in one operation. This leads to a noticeable labor-saving assembly work.

The stator cores are normally fixed to the inside circumference of the motor housing by shrinkage fitting. Hence, the stator cores are prone to impaired alignment precisions which result from inconsistent thermal expansion/contraction of the motor housing subjected to the shrinkage fitting. However, the embodiment does not use the shrinkage fitting for fixing the stator cores 44, thus obviating the aforesaid drawback of impaired alignment precisions. As a result, the stator cores 44 may be assembled with higher precisions.

The motor housing 25 may also be used as a guide jig during the assembly of the stator assembly 23. Specifically, when the stator assembly 23 is fitted in space between the motor housing 25 and the rotor 22, the cylindrical surface of the inside circumference 24 of the motor housing 25 can retain the stator assembly 23 so as to restrict the stator assembly 23 from the radial movement despite the magnetic attraction by the rotor magnets 37.

Consequently, the stator assembly 23 can be fitted in space between the motor housing 25 and the rotor 22 quite easily. In addition, it is ensured that the stator assembly 23 and the rotor 22 are positively prevented from contacting each other to cause damage on each other. Since the motor housing 25 per se is used as the guide jig for the stator assembly 23, the removal of the jig following the assembly of the stator assembly 23 is omitted, although the conventional art requires the removal of the jig. Thus, the labor involved in the assembly work can be reduced even further.

Furthermore, the stator assembly 23 may easily be axially positioned relative to the motor housing 25 by way of the flange 47 (as an axial positioning element) which is provided at the stator yoke 42 and which is received by the circumferential edge 49 of the opening 48 of the motor housing 25. Of the stator assembly 23, the portion to be disposed externally of the motor housing 25, or the flange 47 of the stator yoke 42 is provided with the pins 50 (as circumferential positioning elements). This facilitates the fixing of the stator assembly 23 to the motor housing 25.

The cover assembly 57 including the cover 26 and the resolver stator 56 is formed, thereby permitting one operation to assemble the resolver stator 56 along with the cover 26 to the opening 48 at the other end portion 41 of the motor housing 25. Thus, the labor involved in the assembly work is reduced even further. The method is arranged such that a step of fixing the stator assembly 23 in the motor housing 25 is followed by a step of fixing the cover 26. Thus, the stator assembly 23 is prevented from being turned along with the cover assembly 57 when the cover assembly 57 is turned. Hence, the position of the resolver stator 56 may be adjusted with high precisions.

The invention is not limited to the contents of the foregoing embodiments. For instance, the motor housing 25 may be integrally formed with the reduction-mechanism housing 15 in one piece. The pins 50 may be press-fitted in the pin insertion holes 51 of the stator yoke 42, so that the stator assembly 23 may be fixed in the motor housing 25 as restricted from the rotation and axial movement relative to the motor housing. The number of the pins 50 or of the screws 58 may be 1, or may be 3 or more. A screw may be used in place of the pin 50. Alternatively, the pin 50 and the screw 58 may be formed in one piece such that the positioning and the fixing of the stator assembly 23 and the cover assembly 57 may be accomplished in one operation.

The driving gear and the driven gear are not limited to the spur gear and helical gear may also be used. Alternatively, there may be used a reduction mechanism including a worm shaft as the driving gear and a worm wheel as the driven gear.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

The present application corresponds to Japanese Patent Application No.2003-400139 filed with Japan Patent Office on Nov. 28, 2003, the whole disclosure of which is incorporated hereinto by reference.

The invention claimed is:

1. An electric power steering assembly comprising:
   an electric motor providing steering assist;
   a reduction mechanism for speed reduction of an output rotation of the electric motor; and
   a reduction-mechanism housing accommodating therein the reduction mechanism.

the electric motor including: an output shaft rotatably supported by the reduction-mechanism housing; a rotor having an outer periphery provided with a plurality of rotor magnets and being rotatable integrally with the output shaft; a motor housing having a cylindrical portion with an inner periphery surrounding the outer periphery of the rotor; an annular space defined between the outer periphery of the rotor and the inside circumference of the motor housing; and an annular stator assembly accommodated in the annular space, the motor housing being formed integrally with the reduction-mechanism housing;

the motor housing including an end portion disposed on an opposite side from the reduction-mechanism housing, the end portion of the motor housing defining an opening having a size to allow the stator assembly to be assembled in the motor housing, the electric motor including a cover for closing the opening at the end portion of the motor housing, the stator assembly including a cylindrical stator yoke having an inside circumference and an outside circumference, and being fixed in the motor housing, the inner periphery of the cylindrical portion of the motor housing including a cylindrical guide portion, an outer periphery of a stator yoke including a cylindrical surface as a guided portion, and wherein when the stator assembly is assembled in the annular space via the opening at the end portion of the motor housing, the cylindrical surface of the outer periphery of the stator yoke is guided by the cylindrical surface of the inner periphery of the cylindrical portion of the motor housing so as to prevent the stator assembly from contacting the rotor, further comprising a rotation angle detecting member for sensing a rotation angle of the output shaft, the rotation angle detecting member including a movable portion rotatable integrally with the output shaft, and an annular stationary portion surrounding the movable portion, wherein the electric motor includes a cover-assembly including a plurality of elements, wherein the plural elements includes the cover as a first element, and the stationary portion of the rotation angle detecting member, as a second element, and wherein the cover is assembled to the motor housing in a manner to be adjustable for its circumferential position with respect to the motor housing, the cover adjusted for position thereby accomplishing adjustment for relative positions between the movable portion and the stationary portion of the rotation angle detecting member.

2. An electric power steering assembly according to claim 1, wherein the cover is assembled to a circumferential edge of the opening at the end portion of the motor housing in a manner to be adjustable for its circumferential position with respect to the motor housing.

3. An electric power steering assembly according to claim 2, further comprising a fixing member for fixing the cover to the circumferential edge of the opening at the end portion of the motor housing.

4. An electric power steering assembly according to claim 3, wherein the fixing member includes a screw, wherein the cover includes: a central axis disposed coaxially with the motor housing; a screw insertion hole of an arcuate form about the central axis; and a cylindrical retaining portion disposed coaxially with the central axis and retaining the stationary portion of the rotation angle detecting member, wherein the circumferential edge of the opening of the motor housing includes a screw hole, and wherein the screw is inserted through the screw insertion hole of the cover to be threaded into the screw hole of the motor housing.

5. An electric power steering assembly comprising:

an electric motor providing steering assist;

a reduction mechanism for speed reduction of an output rotation of the electric motor; and a reduction-mechanism housing accommodating therein the reduction mechanism, the electric motor including: an output shaft rotatably supported by the reduction-mechanism housing; a rotor having an outer periphery provided with a plurality of rotor magnets and being rotatable integrally with the output shaft; a motor housing having a cylindrical portion with an inner periphery surrounding the outer periphery of the rotor; an annular space defined between the outer periphery of the rotor and the inside circumference of the motor housing; and an annular stator assembly accommodated in the annular space, the motor housing being formed integrally with the reduction-mechanism housing;

the motor housing including an end portion disposed on an opposite side from the reduction-mechanism housing, the end portion of the motor housing defining an opening having a size to allow the stator assembly to be assembled in the motor housing, the electric motor including a cover for closing the opening at the end portion of the motor housing, the stator assembly including a cylindrical stator yoke having an inside circumference and an outside circumference, and being fixed in the motor housing, the inner periphery of the cylindrical portion of the motor housing including a cylindrical guide portion, an outer periphery of a stator yoke including a cylindrical surface as a guided portion, and wherein when the stator assembly is assembled in the annular space via the opening at the end portion of the motor housing, the cylindrical surface of the outer periphery of the stator yoke is guided by the cylindrical surface of the inner periphery of the cylindrical portion of the motor housing so as to prevent the stator assembly from contacting the rotor, further comprising a rotation angle detecting member for sensing a rotation angle of the output shaft, the rotation angle detecting member including a movable portion rotatable integrally with the output shaft, and an annular stationary portion surrounding the movable portion, wherein the electric motor includes a cover-assembly including a plurality of elements, wherein the plural elements includes the cover as a first element, and the stationary portion of the rotation angle detecting member, as a second element, and wherein the cover is assembled to a circumferential edge of the opening at the end portion of the motor housing in a manner to be adjustable for its circumferential position with respect to the motor housing.

6. An electric power steering assembly according to claim 5, further comprising a fixing member for fixing the cover to the circumferential edge of the opening at the end portion of the motor housing.

7. An electric power steering assembly according to claim 6, wherein the fixing member includes a screw, wherein the cover includes: a central axis disposed coaxially with the motor housing; a screw insertion hole of an arcuate form about the central axis; and a cylindrical retaining portion disposed coaxially with the central axis and retaining the stationary portion of the rotation angle detecting member, wherein the circumferential edge of the opening of the motor housing includes a screw hole, and wherein the screw is inserted through the screw insertion hole of the cover to be threaded into the screw hole of the motor housing.

8. An electric power steering assembly comprising:

an electric motor providing steering assist;

a reduction mechanism for speed reduction of an output rotation of the electric motor; and a reduction-mechanism housing accommodating therein the reduction mechanism, the electric motor including: an output shaft rotatably supported by the reduction-mechanism housing; a rotor having an outer periphery provided with a plurality of rotor magnets and being rotatable integrally with the output shaft; a motor housing having a cylindrical portion with an inner periphery surrounding the outer periphery of the rotor; an annular space defined between the outer periphery of the rotor and the inside circumference of the motor housing; and an annular stator assembly accommodated in the annular space, the motor housing being formed integrally with the reduction-mechanism housing;

the motor housing including an end portion disposed on an opposite side from the reduction-mechanism housing, the end portion of the motor housing defining an opening having a size to allow the stator assembly to be assembled in the motor housing, the electric motor including a cover for closing the opening at the end portion of the motor housing, the stator assembly including a cylindrical stator yoke having an inside circumference and an outside circumference, and being fixed in the motor housing, the inner periphery of the cylindrical portion of the motor housing including a cylindrical guide portion, an outer periphery of a stator yoke including a cylindrical surface as a guided portion, wherein when the stator assembly is assembled in the annular space via the opening at the end portion of the motor housing, the cylindrical surface of the outer periphery of the stator yoke is guided by the cylindrical surface of the inner periphery of the cylindrical portion of the motor housing so as to prevent the stator assembly from contacting the rotor, further comprising an axial positioning element for positioning the stator yoke axially of the motor housing, wherein the stator yoke includes a first end portion relatively farther away from the cover, and another end portion relatively closer to the cover, and wherein the axial positioning element includes a flange formed at the other end portion of the stator yoke and received by a circumferential edge of the opening at the end portion of the motor housing.

9. An electric power steering assembly according to claim 8, further comprising a circumferential positioning element for positioning the stator yoke circumferentially of the motor housing, the circumferential positioning element including a pin engaged with pin insertion holes individually formed at the flange of the stator yoke and at the circumferential edge of the opening of the motor housing.

10. An electric power steering assembly according to claim 8, further comprising a fixing member for fixing the cover with the flange to the circumferential edge of the opening of the motor housing.

11. An electric power steering assembly comprising:

an electric motor providing steering assist;

a reduction mechanism for speed reduction of an output rotation of the electric motor; and a reduction-mechanism housing accommodating therein the reduction mechanism, the electric motor including: an output shaft rotatably supported by the reduction-mechanism housing; a rotor having an outer periphery and being rotatable integrally with the output shaft; a cylindrical motor housing having an inside circumference surrounding the outer periphery of the rotor; an annular space defined between the outer periphery of the rotor and the inside circumference of the motor housing; and an annular stator assembly accommodated in the annular space, the motor housing being formed integrally with the reduction-mechanism housing;

the motor housing including an end portion disposed on an opposite side from the reduction-mechanism housing, the end portion of the motor housing defining an opening having a size to allow the stator assembly to be assembled in the motor housing, the electric motor including a cover for closing the opening at the end portion of the motor housing, the stator assembly including a cylindrical stator yoke having an inside circumference and an outside circumference, and being fixed in the motor housing, the inside circumference of the motor housing including a guide portion, the outside circumference of the stator yoke including a guided portion, and wherein when the stator assembly is assembled in the annular space via the opening at the end portion of the motor housing, the guided portion of the stator yoke is guided by the guide portion of the motor housing so as to prevent the stator assembly from contacting the rotor, further comprising a rotation angle detecting member for sensing a rotation angle of the output shaft, the rotation angle detecting member including a movable portion rotatable integrally with the output shaft, and an annular stationary portion surrounding the movable portion, wherein the electric motor includes a cover-assembly including a plurality of elements, and wherein the plurality of elements includes the cover as a first element, and the stationary portion of the rotation angle detecting member, as a second element, wherein the cover is assembled to the motor housing in a manner to be adjustable in a circumferential direction with respect to the motor housing, and by adjusting the position of the cover in the circumferential direction a relative position of the movable portion and the stationary portion of the rotation angle detecting member is adjusted.

12. An electric power steering assembly according to claim 11, wherein the cover is assembled to a circumferential edge of the opening at the end portion of the motor housing.

13. An electric power steering assembly according to claim 12, further comprising a fixing member for fixing the cover to the circumferential edge of the opening at the end portion of the motor housing.

14. An electric power steering assembly according to claim 11, wherein the rotation angle detecting member includes a resolver, wherein the movable portion includes a resolver rotor, and wherein the stationary portion includes an annular resolver stator surrounding the resolver rotor.

15. An electric power steering assembly according to claim 13, wherein the fixing member includes a screw,
wherein the cover includes: a central axis disposed coaxially with the motor housing; a screw insertion hole of an arcuate form about the central axis; and a cylindrical retaining portion disposed coaxially with the central axis and retaining the stationary portion of the rotation angle detecting member,
wherein the circumferential edge of the opening of the motor housing includes a screw hole, and
wherein the screw is inserted through the screw insertion hole of the cover to be threaded into the screw hole of the motor housing.

16. An electric power steering assembly comprising:
an electric motor providing steering assist;
a reduction mechanism for speed reduction of an output rotation of the electric motor; and
a reduction-mechanism housing accommodating therein the reduction mechanism,
the electric motor including: an output shaft rotatably supported by the reduction-mechanism housing; a rotor having an outer periphery and being rotatable integrally with the output shaft; a motor housing having a cylindrical portion with an inner periphery surrounding the outer periphery of the rotor; an annular space defined between the outer periphery of the rotor and the inside circumference of the motor housing; and an annular stator assembly accommodated in the annular space, the motor housing being formed integrally with the reduction-mechanism housing;
the cylindrical portion of the motor housing including an end portion disposed on an opposite side from the reduction-mechanism housing, the end portion of the cylindrical portion of the motor housing defining an opening having a size to allow the stator assembly to be assembled in the motor housing,
the electric motor including a cover for closing the opening at the end portion of the motor housing,
the stator assembly including a cylindrical stator yoke having an inside circumference and an outside circumference, and being fixed in the motor housing,
the inside circumference of the motor housing including a guide portion, the outside circumference of the stator yoke including a guided portion, and
wherein when the stator assembly is assembled in the annular space via the opening at the end portion of the motor housing, the guided portion of the stator yoke is guided by the guide portion of the motor housing so as to prevent the stator assembly from contacting the rotor, further comprising an axial positioning element for positioning the stator yoke axially of the motor housing,
wherein the stator yoke includes a first end portion relatively farther away from the cover, and another end portion relatively closer to the cover, and
wherein the axial positioning element includes a flange formed at the other end portion of the stator yoke and received by a circumferential edge of the opening at the end surface of the cylindrical portion of the motor housing.

17. An electric power steering assembly according to claim 16, further comprising a circumferential positioning element for positioning the stator yoke circumferentially of the motor housing,
the circumferential positioning element including a pin engaged with pin insertion holes individually formed at the flange of the stator yoke and at the circumferential edge of the opening at the end surface of the cylindrical portion of the motor housing.

18. An electric power steering assembly according to claim 16, further comprising a fixing member for fixing the cover with the flange to the circumferential edge of the opening at the end surface of the cylindrical portion of the motor housing.

* * * * *